(12) United States Patent
Rogers, Jr.

(10) Patent No.: US 9,718,424 B1
(45) Date of Patent: Aug. 1, 2017

(54) SPIDER WEB CLEARING DEVICE

(71) Applicant: William Rogers, Jr., Brusly, LA (US)

(72) Inventor: William Rogers, Jr., Brusly, LA (US)

( * ) Notice: Subject to any disclaimer, the term of this patent is extended or adjusted under 35 U.S.C. 154(b) by 0 days.

(21) Appl. No.: 14/990,022

(22) Filed: Jan. 7, 2016

(51) Int. Cl.
*B60R 19/54* (2006.01)

(52) U.S. Cl.
CPC .................................. B60R 19/54 (2013.01)

(58) Field of Classification Search
CPC .... B60R 19/54; B60R 2011/059; A01M 3/02; A01M 3/027
See application file for complete search history.

(56) References Cited

U.S. PATENT DOCUMENTS

| | | | | |
|---|---|---|---|---|
| 1,727,768 A * | 9/1929 | Erskine | ................... | A01M 3/02 43/137 |
| 2,281,215 A * | 4/1942 | Van Auken | ............ | B60R 19/52 293/115 |
| 4,103,382 A * | 8/1978 | Gitt | ....................... | A47L 25/005 15/104.001 |
| 4,763,379 A * | 8/1988 | Hanna | ..................... | A46B 7/02 15/160 |
| 5,531,478 A * | 7/1996 | Houston | .................... | B62J 6/00 280/756 |
| 5,682,636 A * | 11/1997 | Agustin | .................. | A47L 25/00 15/22.1 |
| 7,513,467 B1 * | 4/2009 | Hurley | ..................... | B60J 1/025 248/125.9 |
| 7,891,618 B2 * | 2/2011 | Carnevali | .......... | A47B 21/0314 248/228.5 |
| 8,439,240 B1 * | 5/2013 | Steiner | ................... | G06Q 50/22 224/274 |
| D686,551 S * | 7/2013 | Lyle | ............................. | D12/181 |
| 9,132,796 B1 * | 9/2015 | Matthews | ............... | B60R 19/54 |
| 9,403,570 B2 * | 8/2016 | Robbins | .................... | B62J 17/02 |
| 2011/0240699 A1 * | 10/2011 | Stacy | .................... | B60Q 1/2661 224/488 |
| 2011/0315727 A1 * | 12/2011 | Ferraioli | ............. | B60R 11/0211 224/409 |
| 2013/0277953 A1 * | 10/2013 | Matthews | ............... | B60R 19/54 280/762 |

* cited by examiner

*Primary Examiner* — Katy M Ebner
(74) *Attorney, Agent, or Firm* — Stevenson IP, LLC

(57) ABSTRACT

A spider web clearing device including an inverted U-shaped clamp having a right side, a left side, a top side, a continuous exterior surface, a continuous interior surface, a lining continuously disposed on the interior surface, and an adjustment knob selectively threadably engageable within an aperture medially disposed through the clamp right side from the exterior surface to the lining. A vertically disposed flexible base unit has a top end and a bottom end, with the bottom end medially mounted to the top side of the clamp. An inverted and elongated triangular attachment has a horizontally disposed linear top edge and a bottom apex. The bottom apex is attached to the top end of the base unit. The clamp is removably attachable to a front rack of an all-terrain vehicle, and the adjustment knob is selectively securable to the front rack of an all-terrain vehicle.

6 Claims, 5 Drawing Sheets

SPIDER WEB CLEARING DEVICE

BACKGROUND OF THE INVENTION

Various types of spider web removal devices are known in the prior art. However, what has been needed is a spider web clearing devices including an inverted U-shaped clamp having a right side, a left side, a top side, a continuous exterior surface, a continuous interior surface, a lining continuously disposed on the interior surface, and an adjustment knob selectively threadably engageable within an aperture medially disposed through the clamp right side from the exterior surface to the lining. What has been further needed is a vertically disposed flexible base unit having a top end and a bottom end, with the bottom end medially mounted to the top side of the clamp. Lastly, what has been needed is an inverted and elongated triangular attachment having a horizontally disposed linear top edge and a bottom apex. The bottom apex is attached to the top end of the base unit. The clamp is removably attachable to a front rack of an all-terrain vehicle, and the adjustment knob is selectively securable to the front rack of an all-terrain vehicle. The spider web clearing device is structured to intercept and destroy spider webs when attached to an all-terrain vehicle, thus helping a rider to avoid spider bites and the distracting annoyance of continually clearing spider webs from his face while he rides.

FIELD OF THE INVENTION

The present invention relates to spider web removal devices, and more particularly, to a spider web clearing device.

SUMMARY OF THE INVENTION

The general purpose of the present spider web clearing device, described subsequently in greater detail, is to provide a spider web clearing device which has many novel features that result in a spider web clearing device which is not anticipated, rendered obvious, suggested, or even implied by prior art, either alone or in combination thereof.

To accomplish this, the present spider web clearing device includes an inverted U-shaped clamp having a right side, a left side, a top side, a continuous exterior surface, a continuous interior surface, a lining continuously disposed on the interior surface, and an adjustment knob selectively threadably engageable within an aperture medially disposed through the right side of the clamp from the exterior surface to the lining. The lining is optionally slip resistant. A vertically disposed flexible base unit has a top end and a bottom end, with the bottom end medially mounted to the top side of the clamp. The base unit is optionally tubular. An inverted and elongated triangular attachment has a horizontally disposed linear top edge and a bottom apex. The bottom apex is attached to the top end of the base unit. A length of the top edge of the attachment is optionally 2.5 inches.

The clamp is removably attachable to a front rack of an all-terrain vehicle, and the adjustment knob is selectively securable to the front rack of an all-terrain vehicle. A height of the attachment is optionally 28 inches, and a length of the top edge of the attachment is optionally 2.5 inches in order to fully cover the area around a rider on the all-terrain vehicle. The inverted triangular shape of the attachment provides a broader coverage area than other web clearing attachments, particularly in the area of a face of the rider. The flexibility of the base unit ensures the resiliency of the device when the rider is traveling through a dense forest of trees and branches. The optional slip resistant lining provides the clamp with a stronger grip on the front rack of the all-terrain vehicle.

Thus has been broadly outlined the more important features of the present spider web clearing device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
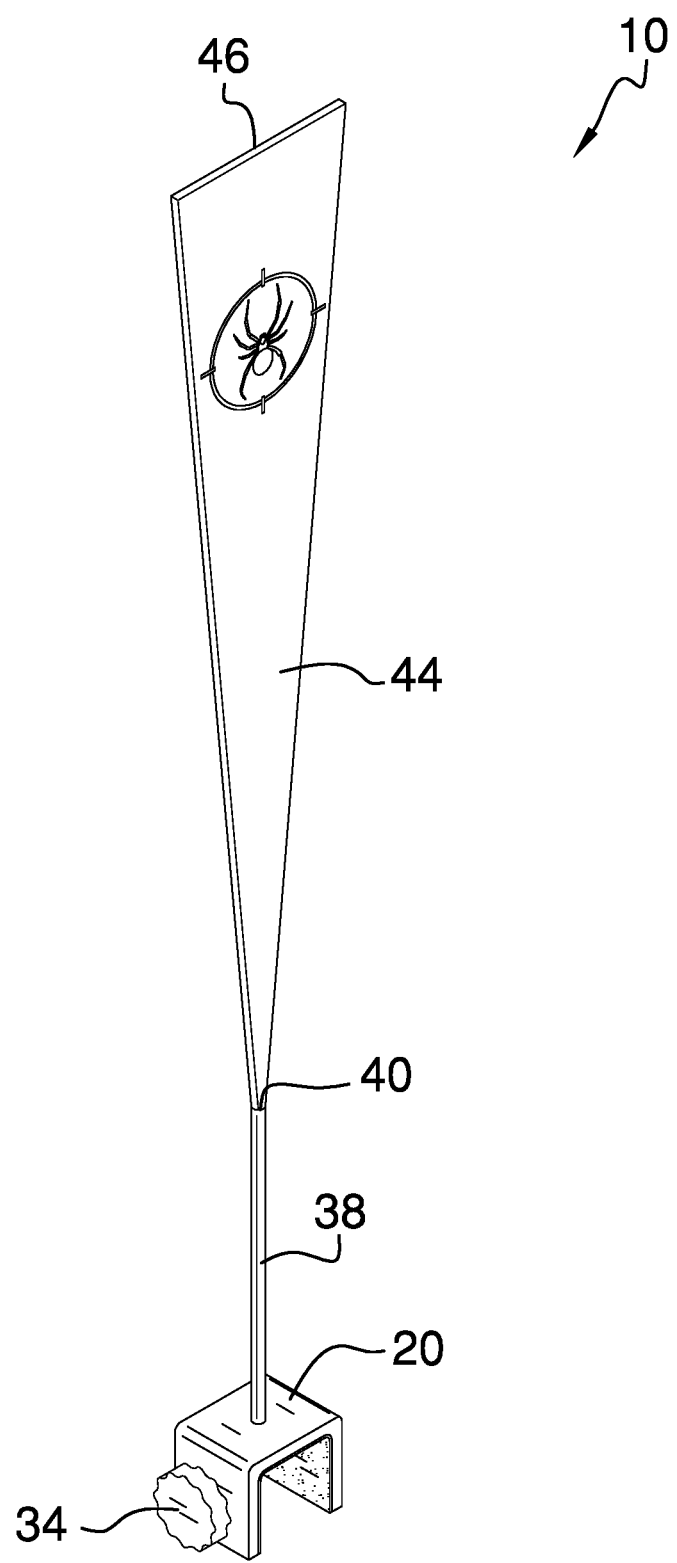
FIG. 1 is a front isometric view.
Figure 2:
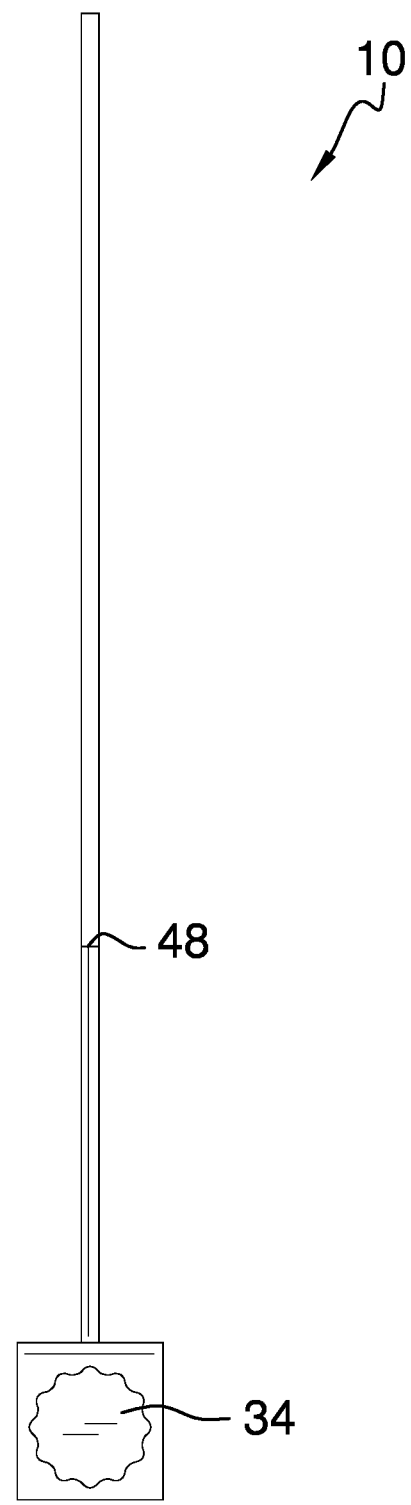
FIG. 2 is a side elevation view.
Figure 3:
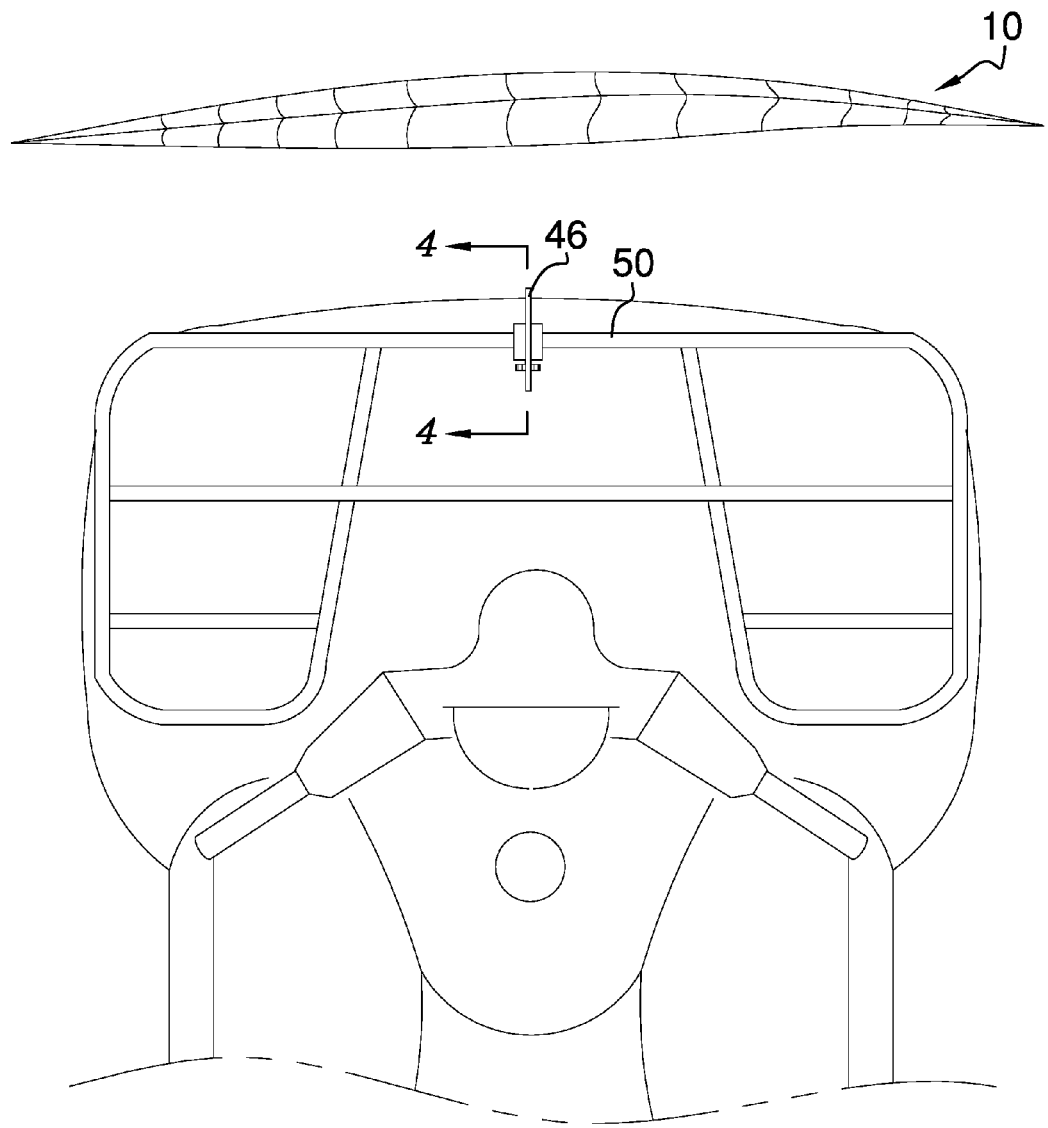
FIG. 3 is a top plan view.
Figure 4:
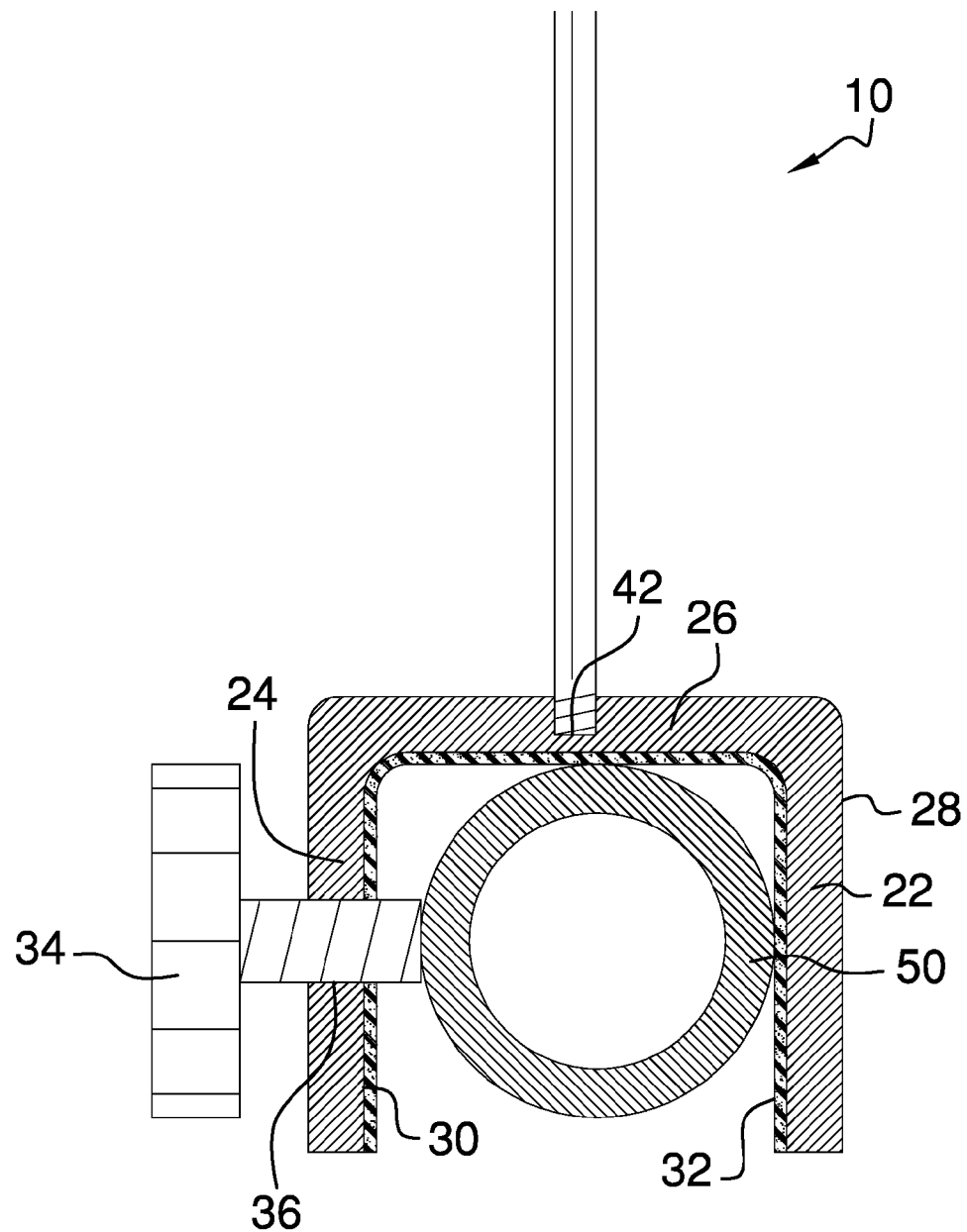
FIG. 4 is a cross-sectional view taken along line 4-4 of FIG. 3.
Figure 5:
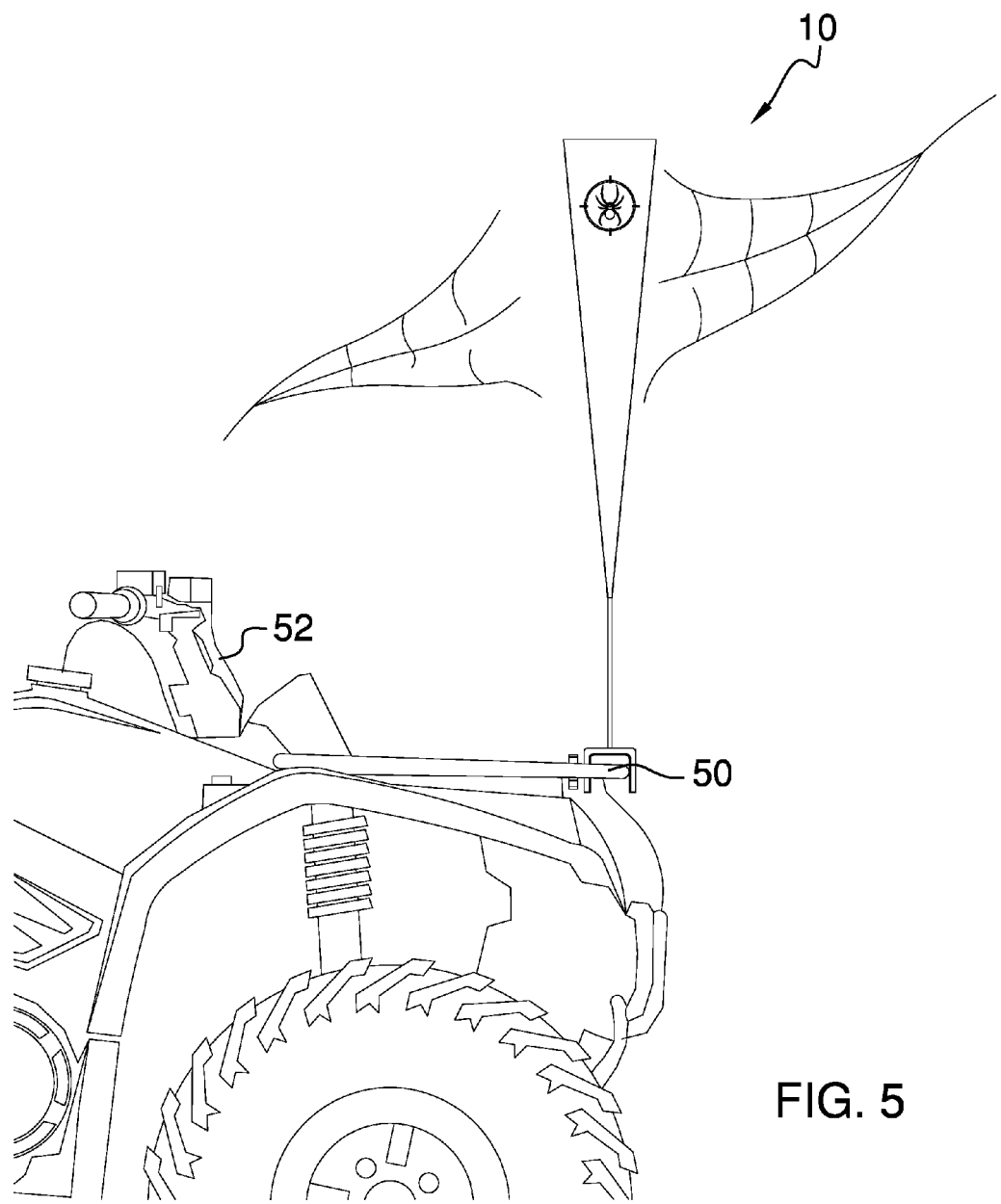
FIG. 5 is an in use view.

With reference now to the drawings, and in particular FIGS. 1 through 5 thereof, an example of the instant spider web clearing device employing the principles and concepts of the present spider web clearing device and generally designated by the reference number 10 will be described.

Referring to FIGS. 1 through 5 the present spider web clearing device 10 is illustrated. The spider web clearing device 10 includes an inverted U-shaped clamp 20 having a right side 22, a left side 24, a top side 26, a continuous exterior surface 28, a continuous interior surface 30, a lining 32 continuously disposed on the interior surface 30, and an adjustment knob 34 selectively threadably engageable within an aperture 36 medially disposed through the right side 22 of the clamp 20 from the exterior surface 28 to the lining 32. A vertically disposed flexible base unit 38 has a top end 40 and a bottom end 42, with the bottom end 42 medially mounted to the top side 26 of the clamp 20. The base unit 38 is optionally tubular. An inverted and elongated single continuous solid triangular attachment 44 has a horizontally disposed linear top edge 46 and a bottom apex 48. The bottom apex 48 is attached to the top end 40 of the base unit 38.

The clamp 20 is removably attachable to a front rack 50 of an all-terrain vehicle 52, and the adjustment knob 34 is selectively securable to the front rack 50 of an all-terrain vehicle 52.

What is claimed is:
1. A spider web clearing device comprising:
an inverted U-shaped clamp having a right side, a left side, a top side, a continuous exterior surface, a continuous interior surface, a lining continuously disposed on the interior surface, and an adjustment knob selectively threadably engageable within an aperture medially disposed through the clamp right side from the exterior surface to the lining;
a vertically disposed flexible base unit having a top end and a bottom end, the bottom end medially mounted to the clamp top side; and
an inverted and elongated single continuous solid triangular attachment having a horizontally disposed linear top edge and a bottom apex, the bottom apex attached to the base unit top end;
wherein the clamp is removably attachable to a front rack of an all-terrain vehicle;

wherein the adjustment knob is selectively securable to the front rack of an all-terrain vehicle.

2. The spider web clearing device of claim 1 wherein the base unit is tubular.

3. The spider web clearing device of claim 1 wherein the lining is slip resistant.

4. The spider web clearing device of claim 1 wherein a height of the attachment is 28 inches.

5. The spider web clearing device of claim 4 wherein a length of the attachment top edge is 2.5 inches.

6. A spider web clearing device comprising:
- an inverted U-shaped clamp having a right side, a left side, a top side, a continuous exterior surface, a continuous interior surface, a slip resistant lining continuously disposed on the interior surface, and an adjustment knob selectively threadably engageable within an aperture medially disposed through the clamp right side from the exterior surface to the lining;
- a vertically disposed flexible and tubular base unit having a top end and a bottom end, the bottom end medially mounted to the clamp top side; and
- an inverted and elongated single continuous solid triangular attachment having a horizontally disposed linear top edge and a bottom apex, the bottom apex attached to the base unit top end;
- wherein a height of the attachment is 28 inches;
- wherein a length of the attachment top edge is 2.5 inches;
- wherein the clamp is removably attachable to a front rack of an all-terrain vehicle;
- wherein the adjustment knob is selectively securable to the front rack of an all-terrain vehicle.

\* \* \* \* \*